US008950828B2

(12) United States Patent
Martin

(10) Patent No.: US 8,950,828 B2
(45) Date of Patent: Feb. 10, 2015

(54) BRAKING SYSTEM

(75) Inventor: Uwe Martin, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 134 days.

(21) Appl. No.: 13/532,744

(22) Filed: Jun. 25, 2012

(65) Prior Publication Data
US 2012/0326494 A1 Dec. 27, 2012

(30) Foreign Application Priority Data

Jun. 27, 2011 (DE) .......................... 10 2011 078 124

(51) Int. Cl.
B60T 8/36 (2006.01)
B60T 17/04 (2006.01)
B60T 8/171 (2006.01)
B60T 8/32 (2006.01)
B60T 13/66 (2006.01)

(52) U.S. Cl.
CPC ............... *B60T 17/043* (2013.01); *B60T 8/171* (2013.01); *B60T 8/329* (2013.01); *B60T 8/368* (2013.01); *B60T 13/66* (2013.01); *Y10S 303/10* (2013.01)
USPC ................................. 303/119.2; 303/DIG. 10

(58) Field of Classification Search
CPC ......... B60T 8/329; B60T 8/171; B60T 8/368; B60T 17/043; B60T 13/66
USPC .............. 303/119.2, 138, DIG. 10; 285/149.1
See application file for complete search history.

(56) References Cited

U.S. PATENT DOCUMENTS

| 3,749,814 | A | * | 7/1973 | Pratt ............................... 174/47 |
| 3,895,850 | A | * | 7/1975 | Engle et al. ...................... 439/34 |
| 4,675,780 | A | * | 6/1987 | Barnes et al. ................. 361/215 |
| 5,222,770 | A | * | 6/1993 | Helevirta ......................... 285/53 |
| 8,435,058 | B2 | * | 5/2013 | Franke ........................... 439/181 |
| 2006/0137587 | A1 | * | 6/2006 | Aisenbrey ................... 114/65 R |
| 2008/0258544 | A1 | * | 10/2008 | Iyatani ............................ 303/10 |
| 2010/0308575 | A1 | * | 12/2010 | Rodenburg ................... 285/256 |
| 2013/0134992 | A1 | * | 5/2013 | Zhu et al. ....................... 324/658 |

* cited by examiner

*Primary Examiner* — Bradley King
(74) *Attorney, Agent, or Firm* — Kenyon & Kenyon LLP

(57) ABSTRACT

A braking system for braking at least one wheel of a vehicle includes at least one brake actuator assigned to the wheel, a hydraulic modulator, at least one brake line path connecting the hydraulic modulator to the brake actuator, the brake line path having at least one electrically conductive brake line, a control unit for controlling and/or regulating the hydraulic system, a sensor assigned to the wheel and a signal line path technically connecting the control unit to the sensor for signal transmission. The brake line forms or participates in forming the signal line path.

17 Claims, 2 Drawing Sheets

BRAKING SYSTEM

BACKGROUND OF THE INVENTION

1. Field of the Invention

The present invention relates to a braking system for braking at least one wheel of a vehicle, having at least one brake actuator assigned to the wheel, a hydraulic modulator, at least one brake line path connecting the hydraulic modulator to the brake actuator, the brake line path having at least one electrically conductive brake line, a control unit for controlling and/or regulating the hydraulic system, a sensor assigned to the wheel and a signal line path technically connecting the control unit to the sensor for signal transmission.

2. Description of Related Art

Such a braking system is known as a braking system for braking the wheels of a motor vehicle using electrical support, for example, an antilock braking system (ABS) and/or an electronic stability program (ESP). Corresponding to the number of wheels, this braking system has a number of assigned brake actuators, a hydraulic modulator, multiple brake line paths having at least one electrically conductive brake line connecting the hydraulic modulator to the brake actuators, a control unit for controlling and/or regulating the hydraulic system, a number of rotational speed sensors (or other sensors) corresponding to the number of wheels and technically connecting the control unit to the rotational speed sensors for signal transmission.

BRIEF SUMMARY OF THE INVENTION

In the case of the system according to the present invention, it is provided that the brake line or at least one of the brake lines forms or participates in forming the signal line path. A braking system of this type allows a weight reduction in the signal line path, and thus a reduction of $CO_2$ emissions, since the corresponding vehicle has a lower curb weight. In connection with the present invention, the participation in forming the signal line path through at least one brake line implies that at least one section of the corresponding brake line also forms a section of the signal line path. The vehicle is preferably a motor vehicle, in particular a passenger car or truck.

In particular, it is provided that a reference potential (the ground potential), which is needed for signal transmission, is —at least partially—transmitted via the body of the vehicle. At least the part of the electrically conductive brake line(s) used for forming the signal line path is electrically insulated from the body.

The braking system is in particular a braking system having electrical support, such as an antilock braking system (ABS) and/or an electronic stability program (ESP). The antilock braking system is a technical system primarily used in motor vehicles, but also in trains and aircraft landing gear, for improving driving safety and for reducing wear on the treads of the wheels. It counteracts a possible locking of the wheels during severe braking by reducing the brake pressure. The electronic stability program or electronic stability control (ESC) refers to an electronically controlled driver assistance system for motor vehicles, which prevents the vehicle from breaking away by targeted braking of individual wheels. The sensor is in particular a component of this electrical support.

Another advantage of using a brake line for signal transmission of the sensor signals is the simplicity of retrofitting an ABS system (ABS plug and play). In various countries, existing vehicles are being retrofitted with ABS. The system has the specific advantage in this case that when only the brake lines are installed, parts of the signal line path or the signal line paths are installed at the same time. The installation of a wiring harness would therefore not be necessary.

According to a preferred specific embodiment of the present invention, it is provided that an end area of the brake line path facing the hydraulic modulator is connected to the control unit for the transmission of signals with the aid of a signal line, and/or an end area of the brake line path facing the brake actuator is connected to the sensor for the transmission of signals with the aid of another signal line.

According to another preferred specific embodiment of the present invention, it is provided that the control unit is mounted on the hydraulic modulator, these two components forming a hydraulic unit. In such a configuration, the control unit and hydraulic modulator are in close proximity to one another. Therefore, a particularly long section of the brake line path may also be used as a signal line path.

Furthermore, the brake line or one of the brake lines is advantageously connected directly to the hydraulic modulator. If the control unit and hydraulic modulator form a hydraulic unit, only a correspondingly short signal line is required between the brake line and the control unit.

According to another preferred specific embodiment of the present invention, it is provided that the brake line is connected to the hydraulic modulator with the aid of a threaded connection. Such threaded connections are presently already common. An additional seal is unnecessary in many cases.

According to another preferred specific embodiment of the present invention, it is provided that the brake line or at least one of the brake lines has a flange on at least one end for establishing the at least one connection. Advantageously, the signal line contacts the brake line on the flange.

According to another preferred specific embodiment of the present invention, it is provided that the signal line extends completely outside of the hydraulic modulator for the connection to the control unit. Such line routing is advantageous in particular for a retrofit of the signal lines, if such retrofitting was not originally intended.

Alternatively, it is provided in particular that at least one part of the signal line extends within the hydraulic modulator for the connection to the control unit.

In the case of such line routing, the signal lines are particularly well protected.

In the case of a sensor that requires a voltage supply, it is provided in particular that this sensor is supplied with voltage via the signal line, and the modulated sensor signal is transmitted simultaneously.

Finally, it is advantageously provided that the sensor is designed as a rotational speed sensor. The rotational speed sensor is, for example, such a sensor that requires a power supply.

DETAILED DESCRIPTION OF THE INVENTION

Figure 1:
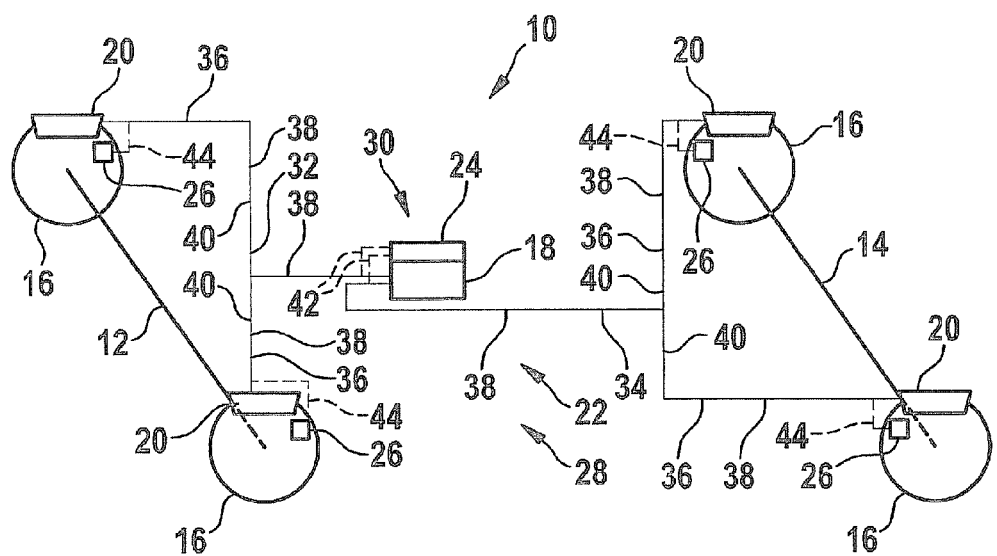
FIG. 1 shows a schematic diagram of a braking system for a vehicle designed as a motor vehicle according to a preferred specific embodiment of the present invention.

FIG. 1 shows a schematic representation of a braking system 10 for a vehicle designed as a motor vehicle. In addition to braking system 10, wheels 16 of this vehicle situated on a front and a rear axle 12, 14 of the vehicle are represented schematically. Braking system 10 is often referred to as a brake system. Braking system 10 represented here is a braking system 10 having electrical support, for example, an antilock braking system (ABS). It has a hydraulic modulator 18, brake actuators 20 designed as wheel brake actuators, a brake line system 22 fluidically connecting hydraulic modulator 18 to brake actuators 20, a control unit 24, multiple sensors 26 designed as rotational speed sensors for ascertaining the particular rotational speed of wheels 16, and a signal line system 28 connecting sensors 26 to control unit 24 via signal transmission. In this connection, electrically conductive parts of brake line system 22 act simultaneously as parts of signal line system 28. Control unit 24 is a control and/or regulating device for controlling and/or regulating braking system 10. This control unit 24 is mounted on the hydraulic modulator 18 in such a way that these two components 18, 24 of braking system 10 form a hydraulic unit 30.

Brake line system 22 is made up of two subsystems 32, 34, of which one subsystem 32 is assigned to wheels 16 of front axle 12 and the other subsystem 34 is assigned to wheels 16 of rear axle 14. Brake line system 22 forms multiple brake line paths 36 between central hydraulic modulator 18 and individual brake actuators 20. Brake actuators 20 are, for example, in the case of drum brakes, designed as wheel cylinders and/or in the case of disk brakes, designed as pistons displacing the brake pads. Each of brake line paths 36 has at least one brake line 38. Each of these brake lines 38 may be designed as a flexible brake line or as a rigid brake line. In braking system 10 shown in FIG. 1, each of brake line paths 36 is formed by a serial connection of a rigid brake line connected to hydraulic modulator 18 and by a flexible brake line connected to assigned brake actuator 20. For example, each of subsystems 32, 34 has a central rigid brake line facing hydraulic modulator 18, the central rigid brake line being connected with the aid of a T-fitting to two flexible brake lines which are assigned to their particular wheels 16. Rigid and/or flexible brake lines 34 are designed as electrically conductive brake lines 34. These electrically conductive brake lines 34 are, for example, made of steel or of nickel-copper (NiCu). Optionally, of course, other brake lines or brake line segments are possible, which are not electrically conductive.

Signal line system 28 technically connects control unit 24 or corresponding terminal connectors of control unit 24 to sensors 26 or corresponding terminal connectors of sensors 26 for signal transmission. Signal line system 28 forms signal line paths 40 between control unit 24 and sensors 26. At least one part of these paths 40 extends across at least a section of a brake line 38. In the exemplary embodiment of FIG. 1, within each of signal line paths 40, a separate signal line 42 connects control unit 24 to a brake line 38 connected to hydraulic modulator 18, and another separate signal line 44 connects sensor 26 to a brake line 38 connected to brake actuator 20.

Figure 2:
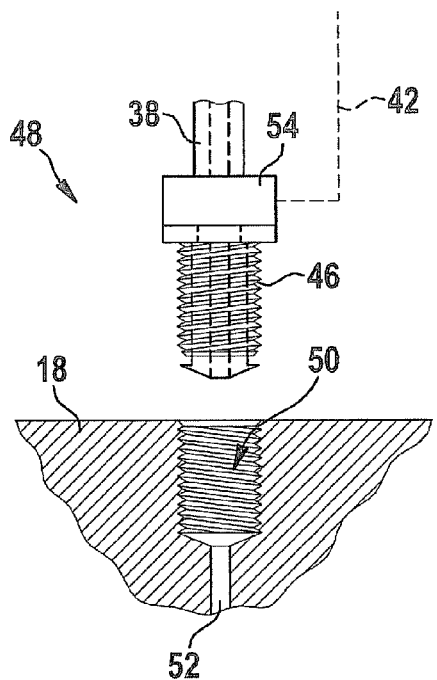
FIG. 2 shows a connection of a brake line having a signal line connected to it and a receptacle in the hydraulic unit for accommodating the terminal connector.

FIG. 2 shows an end section of a brake line 38. Brake line 38 or at least one of brake lines 38 is provided with a flange 46 designed as a flared flange at one end or both ends. This flange is connected with the aid of threaded connection 48 to hydraulic modulator 18. For that purpose, flange 46 is screwed with its external thread into receptacle 50 designed as a blind hole of hydraulic modulator 18 having an internal thread. Receptacle 50 is adjoined by an internal channel 52 of the hydraulic modulator. Through the flange 46, a (fluid)-tight connection is established without an additional seal.

Signal line 42 which is connected to control unit 24 contacts brake line 38 electrically on its flange 46 with the aid of a contact element 54 designed as a contact sleeve. This flange 46 producing the connection to hydraulic modulator 18 furthermore provides a conductive connection to brake line 38. The electrical insulation between brake line 38 and the (vehicle) ground as a reference potential is made, for example, by forming receptacle 50 in an area of hydraulic modulator 18 which is designed to be non-conductive, and/or the part of flange 46 used for forming threaded connection 48 is made of non-conductive material. Control unit 24 has in turn a connection to ground via corresponding control unit plug connectors.

Figure 3:
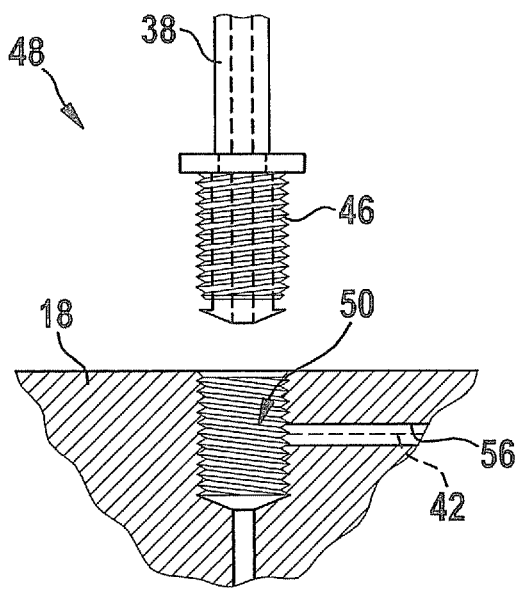
FIG. 3 shows a terminal connector of a brake line and a receptacle in the hydraulic unit having a signal line connected to it.

FIG. 3 shows an alternative signal connection in which the signal connection from flange 46 to control unit 24 is established with the aid of a signal line 42 extending within hydraulic modulator 18. Since this alternative essentially corresponds to the specific embodiment of FIG. 2, only the differences will be discussed here. Signal line 42 extends in this specific embodiment in a bore 56 within hydraulic modulator 18. It is thus possible to reduce the number of terminal connectors of the plug connection to control unit 24.

Figure 4:
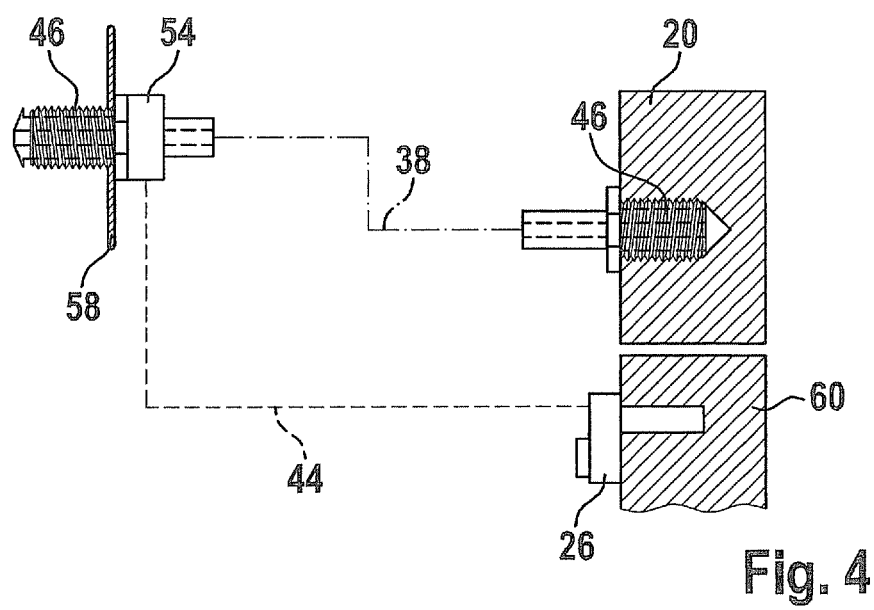
FIG. 4 shows a brake line connected to a brake actuator, the brake line having a terminal connector which is electrically connected to a sensor via a signal line.

FIG. 4 finally shows the system of brake actuator 20, sensor 26, flexible brake line 38 and signal line 44 in the area of assigned wheel 16. Brake line path 36, formed in part by brake line 38, includes a serial connection made up of a flexible brake line and a rigid brake line, only the end area having the flexible brake line facing brake actuator 20 being shown. The rigid brake line is not shown in FIG. 4, but instead only the transition between the two brake lines 38 attached to a body part 58. Among other things, this transition is formed in part by a flange 46 of the flexible brake line. This flange 46 is connected electrically to further signal line 44 with the aid of contact element 54. On its other end, this (flexible) signal line 44 contacts sensor 26 designed as a rotational speed sensor.

A flange 46 is also present on the other end of the flexible brake line. The brake line is fluidically connected to brake actuator 20 with the aid of this flange 46. For that purpose, flange 46 is screwed with its external thread into receptacle 50 designed as a blind hole of brake actuator 20 having an internal thread.

The rigid brake line extends from hydraulic modulator 18 to the body on body part 58; the flexible brake line forms the end area to brake actuator 20. This part of corresponding brake line path 36 must be flexible due to the wheel movements. For that reason, a connection must also be established to sensor 26 with the aid of flexible signal line 44. This sensor 26 is mounted, for example, on wheel hub 60 of wheel 16.

What is claimed is:

1. A braking system for braking at least one wheel of a vehicle, comprising:
   at least one brake actuator assigned to the wheel;
   a hydraulic modulator;
   at least one brake line path connecting the hydraulic modulator to the brake actuator, wherein the brake line path includes at least one electrically conductive brake line;
   a control unit for controlling the hydraulic system;
   a sensor assigned to the wheel; and
   a signal line path communicatively connecting the control unit to the sensor for signal transmission;
   wherein the brake line forms at least at least a portion of the signal line path;
   wherein at least one of the following is satisfied:
   (i) an end area of the brake line path facing the hydraulic modulator is communicatively connected to the control unit for signal transmission with the aid of a first signal line; and (ii) an end area of the brake line path facing the brake actuator is communicatively connected to the sensor for signal transmission with the aid of a second signal line;

wherein the brake line has a flange on at least one end for establishing a connection; and wherein at least one of the first and second signal lines contacts the brake line on the flange.

2. The braking system as recited in claim 1, wherein the control unit is mounted on the hydraulic modulator, and wherein the control unit and the hydraulic modulator form a hydraulic unit.

3. The braking system as recited in claim 1, wherein the brake line is directly connected to the hydraulic modulator.

4. The braking system as recited in claim 2, wherein the brake line is connected to the hydraulic modulator with the aid of a threaded connection.

5. The braking system as recited in claim 1, wherein the first signal line extends completely outside of the hydraulic modulator for the connection to the control unit.

6. The braking system as recited in claim 1, wherein at least a portion of the first signal line is located within the hydraulic modulator for the connection to the control unit.

7. The braking system as recited in claim 1, wherein the sensor is configured as a rotational speed sensor.

8. The braking system as recited in claim 1, wherein the flange of at least one of the brake lines is a flared flange at one end or both ends.

9. The braking system as recited in claim 8, wherein the flange is connected with a threaded connection to a hydraulic modulator.

10. The braking system as recited in claim 9, wherein the flange is screwed with its external thread into a receptacle configured as a blind hole of the hydraulic modulator having an internal thread.

11. The braking system as recited in claim 10, wherein the receptacle is adjoined by an internal channel of the hydraulic modulator.

12. The braking system as recited in claim 11, wherein the flange provides a fluid-tight connection without an additional seal.

13. The braking system as recited in claim 1, wherein the signal line connected to the control unit contacts the brake line electrically on the flange with a contact element configured as a contact sleeve.

14. The braking system as recited in claim 13, wherein the flange producing the connection to the hydraulic modulator further provides a conductive connection to the brake line.

15. The braking system as recited in claim 14, wherein the electrical insulation between the brake line and the vehicle ground as a reference potential is made by forming a receptacle in an area of the hydraulic modulator, which is non-conductive, and/or the part of the flange used for forming the threaded connection is made of non-conductive material, and wherein the control unit has a connection to ground via corresponding control unit plug connectors.

16. The braking system as recited in claim 1, wherein the signal connection from the flange to the control unit is established with another signal line extending within the hydraulic modulator.

17. The braking system as recited in claim 16, wherein the another signal line extends in a bore within the hydraulic modulator, so as to reduce the number of terminal connectors of the plug connection to the control unit.

* * * * *